United States Patent
Sigoli et al.

(10) Patent No.: US 6,875,467 B2
(45) Date of Patent: Apr. 5, 2005

(54) CRACK RESISTANT SOL-GEL WAFER COATINGS FOR INTEGRATED OPTICS

(75) Inventors: Fernando A. Sigoli, Torrance, CA (US); Lothar U. Kempen, Redondo Beach, CA (US); Edgar A. Mendoza, Redondo Beach, CA (US)

(73) Assignee: Optinetrics, Inc., Torrance, CA (US)

( * ) Notice: Subject to any disclaimer, the term of this patent is extended or adjusted under 35 U.S.C. 154(b) by 15 days.

(21) Appl. No.: 10/320,313

(22) Filed: Dec. 15, 2002

(65) Prior Publication Data

US 2004/0115347 A1 Jun. 17, 2004

(51) Int. Cl.⁷ ............................. B05D 1/38; B05D 3/12
(52) U.S. Cl. ........................ 427/240; 427/336; 427/379; 427/387; 427/389.7; 427/397.7; 427/407.1; 427/407.2; 427/419.2; 427/419.7; 427/425; 118/52; 118/320

(58) Field of Search ................................. 427/240, 425, 427/336, 419.7, 419.2, 407.2, 407.1, 379, 387, 397.7, 389.7; 118/52, 320

(56) References Cited

U.S. PATENT DOCUMENTS

| | | | | |
|---|---|---|---|---|
| 5,424,102 A | * | 6/1995 | Mizukuki et al. | 427/510 |
| 5,476,717 A | * | 12/1995 | Floch | 428/421 |
| 6,248,168 B1 | * | 6/2001 | Takeshita et al. | 118/52 |
| 6,309,728 B1 | * | 10/2001 | Usami et al. | 428/64.1 |

* cited by examiner

Primary Examiner—Kirsten Jolley
(74) Attorney, Agent, or Firm—Howard R. Popper

(57) ABSTRACT

A method of preparing a multi-layer, crack resistant sol-gel glass derived coating on a substrate by removing the outer periphery of each layer before curing the layer and depositing any succeeding layer.

6 Claims, 3 Drawing Sheets

CRACK RESISTANT SOL-GEL WAFER COATINGS FOR INTEGRATED OPTICS

FIELD OF THE INVENTION

This invention relates to integrated optics devices fabricated from sol-gel derived glass.

BACKGROUND OF THE PRIOR ART

Integrated optics is a term used to describe a rigid structure which has a plurality of waveguides defined therein, such as in the well-known arrayed waveguide grating (AWG). Such arrayed waveguide grating devices are commercially available and are typically fabricated by well-known photo-lithographic techniques used to configure film overlays on a silicon substrate. Copending application Ser. No. 09/574,840 filed May 19, 2000 for the inventors of the invention of the present application and assigned to the assignee of the present application, discloses a process for configuring thin films of sol-gel into a variety of structures useful for transmission of optical energy.

At the present time, films prepared from sol-gel with the required thickness and flatness to create integrated optic waveguiding structures can be produced by conventional spin coating techniques using standard semiconductor type coating equipments, such as those commercially available from Silicon Valley Group (SVG), Suss Micro Tec, Inc., or other manufacturers. While the sol-gel is in liquid form, centrifugal force acts as a surface leveling agent on the dispensed liquid. Unfortunately, the tendency of the liquid film toward uniformity does not apply at the outer edge of a spinning disk because the surface of the liquid film must curve and intersect the substrate somewhere in the vicinity of the edge. An effect may be produced where the outer periphery of the sol-gel has a different thickness than the rest of the surface, in the industry sometimes referred to as "edge bead" formation. This variation on the sol gel film thickness at the edge of the wafer often results in the formation of micro-cracks at the edge of the film. These micro-cracks further propagate onto the film structure during the subsequent heat treatment steps resulting in complete catastrophic failure of the film. Once the sol-gel film has cracked, all of the effort that has gone into the production of high-definition, sub-microns structures is wasted as the wafer becomes useless and must then be discarded. Furthermore, if a contact photo mask is to be used with a photosensitive sol gel to create a waveguide structure, this rim must be removed as otherwise there will be gaps between the mask and the photosensitive surface through which light may enter and substantially degrade the image quality and resolution of the photolithographed waveguide pattern.

It would be of great advantage to be able to fabricate glass integrated optical devices using a sol-gel process that provided extremely flat surfaces onto which submicron dimensioned features could be defined without the danger of the sol-gel film cracking or absorbing efficiency-reducing amounts of power.

SUMMARY OF THE INVENTION

The invention is based on the recognition that thin sol gel films tend to crack when formed in layers sufficiently thick to be useful for forming optical waveguide structures. The invention is further based on the realization that even when films of a useful thickness are formed by a succession of relatively thin films, cracking still occurs. But cracking can be avoided by forming a succession of relatively thin films of decreasing surface area resulting in a film side profile similar to that of a "ziggurat".

BRIEF DESCRIPTION OF THE DRAWING

The foregoing and other features of the present invention may become more apparent from a reading of the ensuing description together with the drawing, in which.

DETAILED DESCRIPTION

In the ensuing description references will be made to FIGS. 1–4 and the corresponding steps of flow diagram FIG. 6.

Figure 1:
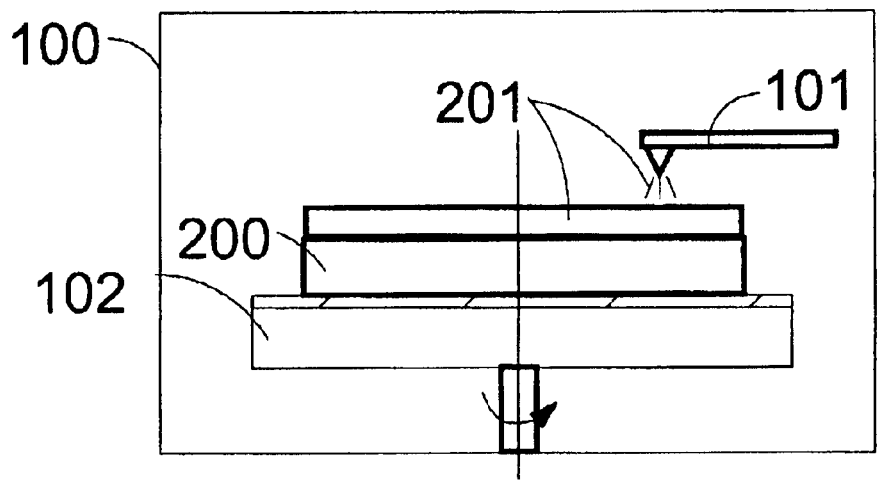
FIGS. 1–4 are successive views of the fabrication of a sol-gel film in a spin coating chamber in accordance with the principles of this invention.

FIG. 1 shows a spin coating chamber 100, such as the "Falcon" spin coater manufactured by Suss Micro Tec, having a spin table 102 and a dispensing arm 101 which moves from the outer periphery of the spin table towards its center under program control to dispense various fluids. As is well known, the atmosphere within chamber 100 may be controllably specified. It is desired to use chamber 100 and dispensing arm 101 to apply various layers of coatings, especially sol-gel derived glass, onto substrate 200. Substrate 200 may be glass, silicon or any other conventionally useful material.

Figure 6:
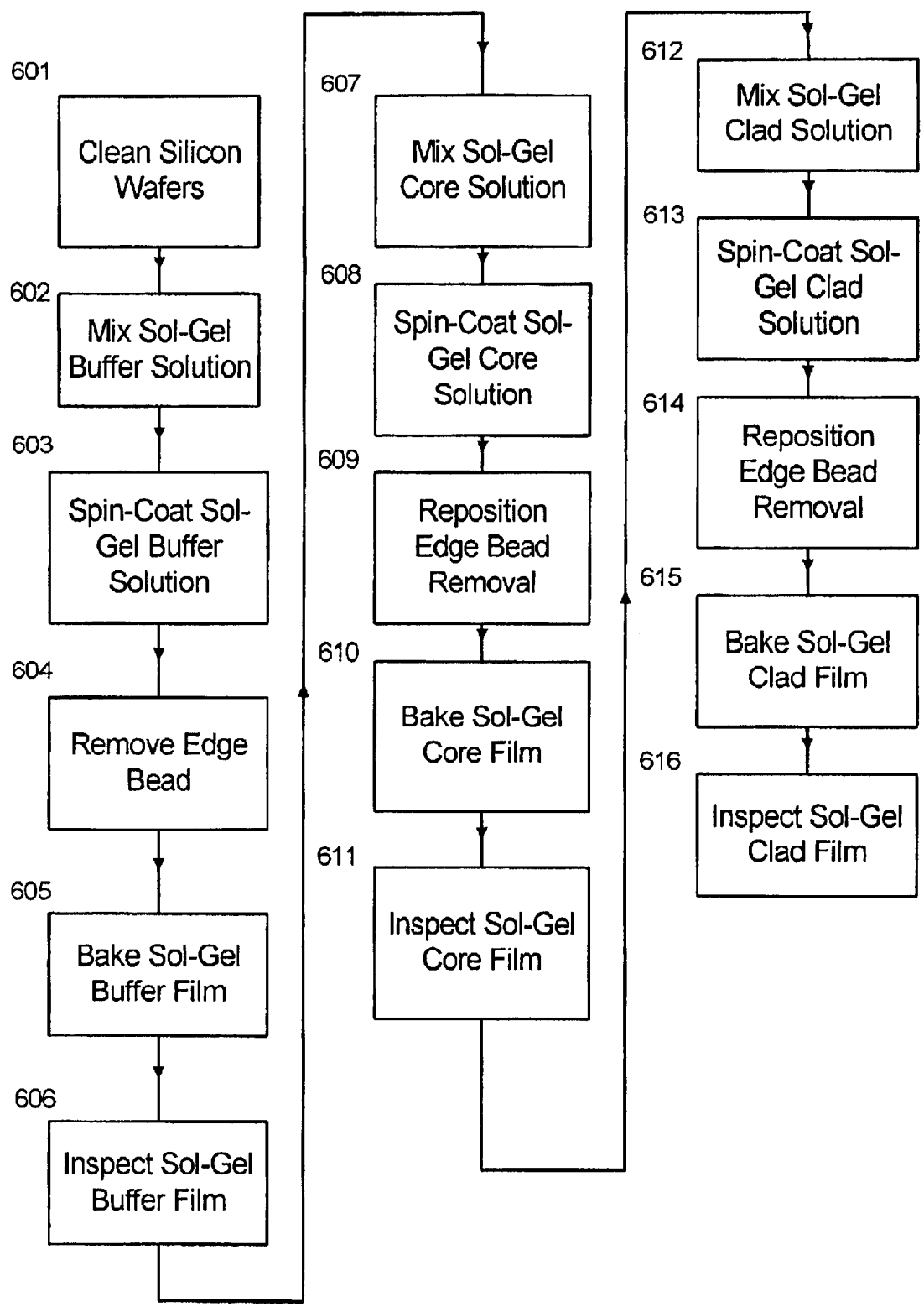
FIG. 6 is a flow diagram of the process steps for forming the sol gel film of the invention.

An (optional) first step in the fabrication, as shown in FIG. 6 at 601, is to clean the substrate in any conventional manner. Then, the first solution to be applied to the substrate, typically a sol-gel buffer solution 201 is mixed at 602. When buffer solution 201 is sufficiently mixed, it is dispensed onto substrate 200, as shown in FIG. 1, by arm 101 while the spin table is rotated at a comparatively low speed. When buffer solution 201 has sufficiently coated substrate 200, the rotational speed of spin table 102 is increased and maintained at a speed to produce a buffer coating of uniform thickness. See step 603, FIG. 6.

Figure 2:
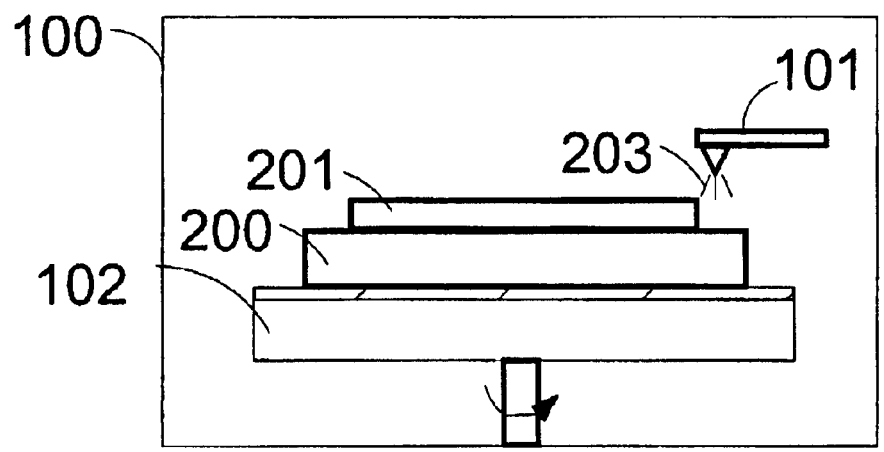

In accordance with an aspect of the invention, after the desired thickness and uniformity of buffer coating 201 has been achieved, a portion of its outer periphery will be removed, (see step 604, FIG. 6 and FIG. 2).

Referring now to FIG. 2, the step of removing the outer periphery of buffer layer 201 is shown. Dispensing arm now travels only a short distance radially inward of the spin table and dispenses a sufficient quantity of solvent, illustratively isopropyl alcohol, to dissolve away the outer "rim" of coating 201, illustratively approximately 1 mm. After the outer periphery of buffer coating 201 has been removed, the buffer layer is baked onto substrate 200, (step 605, FIG. 6). When the baking has completed, the buffer layer is inspected, step 606, and the solution for the next coating is mixed, step 607.

Figure 3:
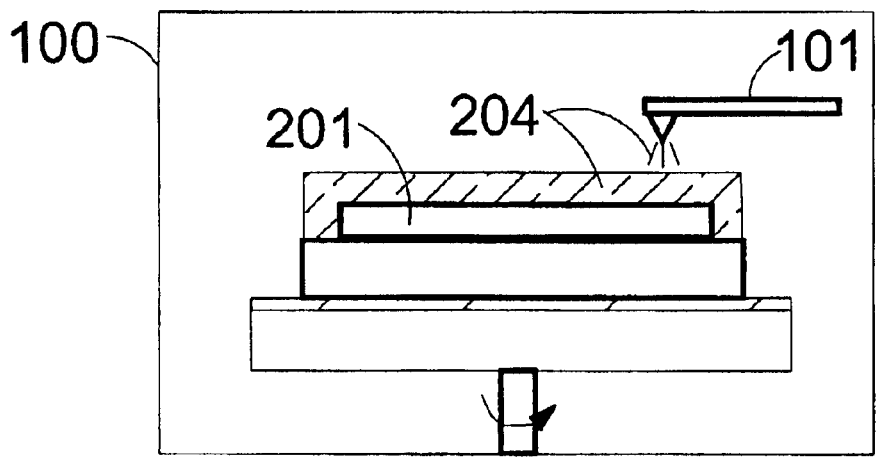

Referring to FIG. 3, the next coating 204, typically a "core" layer, is dispensed by arm 101 over the buffer layer while the spin table is rotated. Then the spin table speed is increased to achieve a core layer 204 of uniform thickness over the buffer layer, step 608, FIG. 6. However, the outer periphery core layer 204 will overlap the edge of buffer layer 201 and a small "ring" layer of solution 204 will be applied at the outer edge of substrate 200. The portion of layer 204 that overlaps buffer layer 201 will be removed in the next step, 609, together with an outer peripheral portion of core layer 204 will be removed, see FIG. 6, and FIG. 4.

Figure 4:
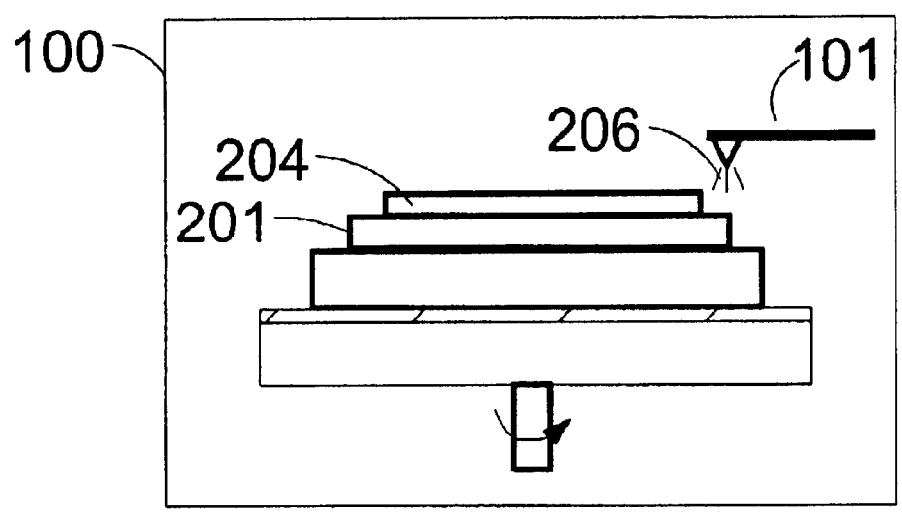

In FIG. 4, dispensing arm 101 now travels a slightly greater distance radially inward than it did in FIG. 2, and again dispenses a solvent to remove the outer peripheral portion of core layer coating 204. After the outer peripheral portion of core layer 204 has been removed, the coated substrate is baked, step 610, FIG. 6. Again, the baked core layer is inspected, step 611, FIG. 6, and if the inspection step is passed, the solution for the next coating, typically a cladding solution, is mixed at step 612. The cladding solution is dispensed in a manner similar to step 608 and its outer periphery is removed in a manner similar to that described for step 609.

Figure 5:
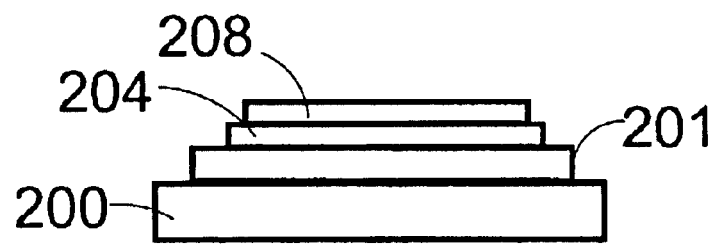
FIG. 5 is a side view of a substrate having the crack-resistant sol-gel film of the invention.

The result of the fabrication process is a multilayer film shown in FIG. 5 having a succession of thicknesses suitable for the formation of waveguides useful for the transmission of optical energy.

EXAMPLES

In one illustrative embodiment, the following procedures were employed:
For the Buffer and Cladding Layers:
a. Add 95.5 g (100 ml) of methyl trimethoxysilane to a 500 ml plastic bottle;
b. Add 93.3 g (100 ml) of tetraethyl orthosilicate to the bottle;
c. Add 40 g (40 ml) of 0.05N hydrochloric acid to the bottle;
d. Mix at 6000 RPM in a water bath at 25° C. for 45 minutes.
e. Measure viscosity (15±2 cP).
For the Core Layer:
Same as for the buffer layer, except add 3.6% per initial volume of trimethyl tin iodide and stir for 40 minutes before using.

The foregoing is deemed to be descriptive of the principles of the invention. Further and other modifications will be apparent to those skilled in the art and may be made without, however, departing from the spirit and scope of the invention.

What is claimed is:

1. A method of preparing a multi-layer, crack resistant sol-gel glass derived coating on a substrate by the steps of
spin coating a first sol-gel layer on said substrate;
removing an outer peripheral portion of said spin-coated layer;
curing said spin coated layer;
depositing at least one additional spin-coated layer;
removing from each said additional spin-coated layer an additional outer peripheral portion beyond the edge of said first removed outer peripheral portion; and
curing each said additional deposited layer.

2. A method according to claim 1 wherein a layer of sol-gel is formed of a viscous mixture of methyl trimethoxysilane and tetraethyl orthosilicate in the presence of diluted hydrochloric acid.

3. A method of making a crack resistant sol-gel film in layers sufficiently thick to be useful for forming optical waveguide structures, comprising the steps of:
a. spin-coating a substrate selected from the group consisting of glass and silicon to deposit a buffer layer of sol-gel;
b. removing the outer periphery of said buffer layer of spin-coated sol-gel from said substrate;
c. curing said buffer layer;
d. spin-coating a core layer of sol-gel on top of said buffer layer;
e. removing more of the outer periphery of core layer than has been removed from said buffer layer;
f. curing said core layer;
g. spin-coating a cladding layer of sol-gel on top of said core layer;
h. removing more of the outer periphery of said cladding layer than has been removed from said buffer and core layers; and
i. curing said cladding layer.

4. A method according to claim 3 wherein the spin-coated sol-gel substrate is cured by baking.

5. A method according to claim 3 wherein said outer periphery of said sol-gel is removed by spraying a solvent at said outer periphery.

6. A method according to claim 3 wherein a layer of sol-gel is formed of a viscous mixture of methyl trimethoxysilane and tetraethyl orthosilicate in the presence of diluted hydrochloric acid.

* * * * *